(12) United States Patent
Marmur

(10) Patent No.: US 6,832,052 B1
(45) Date of Patent: Dec. 14, 2004

(54) OPTICAL TRANSPONDER

(75) Inventor: Oren Marmur, Kiryat Ono (IL)

(73) Assignee: ECI Telecom Ltd., Petach Tikva (IL)

( * ) Notice: Subject to any disclaimer, the term of this patent is extended or adjusted under 35 U.S.C. 154(b) by 0 days.

(21) Appl. No.: 09/572,090

(22) Filed: May 17, 2000

(30) Foreign Application Priority Data

May 16, 2000 (IL) .............................................. 136177

(51) Int. Cl.[7] .............................................. H04B 10/02
(52) U.S. Cl. ........................ 398/175; 398/25; 398/177
(58) Field of Search ................................ 398/174, 175, 398/176, 177, 178, 179, 173, 180, 181, 25, 18; 702/124, 126, 198; 370/252; 714/704

(56) References Cited

U.S. PATENT DOCUMENTS

| | | | |
|---|---|---|---|
| 3,985,975 A | 10/1976 | Steensma | 379/274 |
| 3,993,976 A | 11/1976 | Ginsburg | 382/211 |
| 4,200,861 A | 4/1980 | Hubach et al. | 382/216 |
| 4,385,322 A | 5/1983 | Hubach et al. | 348/243 |
| 4,543,660 A | 9/1985 | Maeda | 382/218 |
| 4,623,778 A | 11/1986 | Cullen et al. | 219/124.34 |
| 4,636,612 A | 1/1987 | Cullen | 219/124.34 |
| 4,831,616 A | 5/1989 | Huber | 398/100 |
| 4,932,038 A * | 6/1990 | Windus | 375/214 |
| 4,939,727 A | 7/1990 | Gianola et al. | 700/4 |
| 5,060,282 A | 10/1991 | Molley | 382/211 |
| 5,113,151 A | 5/1992 | Yamamoto et al. | 330/308 |
| 5,303,381 A | 4/1994 | Yagasaki | 707/7 |
| 5,365,328 A | 11/1994 | Anderson | 356/73.1 |
| 5,432,329 A | 7/1995 | Colgate, Jr. et al. | 235/487 |
| 5,465,238 A | 11/1995 | Russell | 365/234 |
| 5,598,389 A | 1/1997 | Nakano et al. | 369/47.32 |
| 5,673,129 A | 9/1997 | Mizrahi | 398/95 |
| 5,815,294 A | 9/1998 | Ishikawa et al. | 398/158 |
| 5,825,949 A | 10/1998 | Choy et al. | 385/24 |
| 5,841,907 A | 11/1998 | Javidi et al. | 382/210 |
| 5,870,217 A | 2/1999 | Itou et al. | 398/97 |
| 5,912,740 A | 6/1999 | Zare et al. | 356/437 |
| 5,914,794 A | 6/1999 | Fee et al. | 398/20 |
| 6,025,947 A * | 2/2000 | Sugaya et al. | 398/97 |
| 6,038,073 A | 3/2000 | Ono | 359/161 |
| 6,111,681 A | 8/2000 | Mizrahi et al. | 398/196 |
| 6,246,985 B1 | 6/2001 | Kanevsky et al. | 704/270 |
| 6,249,365 B1 | 6/2001 | Mizrahi et al. | 398/9 |
| 6,269,204 B1 | 7/2001 | Ishikawa | 385/24 |
| 6,278,961 B1 | 8/2001 | Kadtke et al. | 702/189 |
| 6,285,637 B1 | 9/2001 | Manter et al. | 369/147.1 |
| 6,433,899 B1 * | 8/2002 | Anslow et al. | 398/5 |
| 6,466,886 B1 * | 10/2002 | Marmur | 702/126 |

FOREIGN PATENT DOCUMENTS

| | | |
|---|---|---|
| EP | 0 901 245 A1 | 3/1999 |
| JP | 10-313277 A | 11/1998 |
| JP | 11-098086 | 4/1999 |

* cited by examiner

Primary Examiner—Leslie Pascal
Assistant Examiner—Christina Y Leung

(57) ABSTRACT

An optical transponder capable of effecting performance monitoring on the electrical signal equivalents of at least two different optical signal types each uniquely identifiable in terms of transmission protocol and/or bit rate. The optical transponder includes an optical/electrical (O/E) receiver module for converting an ingressing optical signal from an optical signal source into an electrical signal; a performance monitoring module for effecting performance monitoring on the electrical signal; and an electrical/optical (E/O) transmitter module for regenerating an egressing optical signal from the electrical signal for feeding to an optical signal destination.

13 Claims, 6 Drawing Sheets

| OPTICAL SIGNAL TYPE | | REFERENCE PATTERN | | |
|---|---|---|---|---|
| TRANSMISSION PROTOCOL | BIT RATE | FEATURE VECTOR | BYTE LENGTH OF FEATURE VECTOR | BYTE LENGTH BETWEEN IMMEDIATELY CONSECUTIVE OCCURRENCES OF FEATURE VECTOR |
| STM-1 | 155 MBIT/S | A1/A2 BYTES DEFINED IN ITU-T G.707 | 6 | 2,430 |
| STM-4 | 622 MBIT/S | -"- | 24 | 9,720 |
| STM-16 | 2,488 MBIT/S | -"- | 96 | 38,880 |
| STM-64 | 10 GBIT/S | -"- | 384 | 155,520 |
| ATM | 622 MBIT/S | FIRST FOUR BYTES OF THE F3 OAM CELLS DEFINED IN AF-PHY-00128 | 4 | 22,843 |
| ATM | 2.5 GBIT/S | -"- | 4 | 22,843 |
| GE | 1.25 GBIT/S | K28.5 SYNCHRONIZATION WORD DEFINED IN IEEE 802.3z | 10 BITS | UP TO 2,430 |
| IP OVER SDL | 2.5 GBIT/S | 16 BIT CRC OF SDL HEADER DEFINED IN SDL DATA LINK SPEC., LUCENT TECHNOLOGIES, SEPT. 1998 | 2 | UP TO 65,336 |
| IP OVER SDL | 10 GBIT/S | -"- | 2 | UP TO 65,336 |

FIG.4

OPTICAL TRANSPONDER

FIELD OF THE INVENTION

The invention is in the field of optical communication.

BACKGROUND OF THE INVENTION

Optical communication networks include network elements with plug-in boards offering different degrees of functionality and ranging from optical repeaters for merely transponding an optical signal to optical transponders capable of both transponding an optical signal and performance monitoring. Optical repeaters can transpond different optical signals both in terms of transmission protocol and bit rate, namely, the same optical repeater can transpond inter alia SDH at different rates, ATM at different rates, PDH at different rates, and others. Against this, an optical transponder transponds and performance monitors a single optical signal i.e. a specific transmission protocol at a specific bit rate. The plug-in boards are periodically replaced for maintenance purposes, and, in the case of optical transponders, as the need may arise to support new system configurations.

SUMMARY OF THE INVENTION

In accordance with a first aspect of the present invention, there is provided an optical transponder comprising an optical/electrical (O/E) receiver module for converting an ingressing optical signal from an optical signal source to an electrical signal; a performance monitoring module for effecting performance monitoring on said electrical signal, an electrical/optical (E/O) transmitter module for regenerating an egressing optical signal from said electrical signal for feeding to an optical signal destination, and wherein said performance monitoring module is capable of effecting performance monitoring on the electrical signal equivalents of at least two different optical signal types each uniquely identifiable in terms of transmission protocol and/or bit rate.

The first aspect of the present invention is directed toward providing an optical transponder capable of supporting performance monitoring (PM) of at least two different optical signal types, thereby increasing its deployment flexibility and facilitating inventory reduction. An optical transponder of the present invention preferably supports performance monitoring of optical signals of different transmission protocols at one or more different bit rates. To be updated with the optical signal type of an ingressing optical signal, an optical transponder of the present invention can either be externally configurable by way of a network management system, or self-configurable if provided with a reference pattern spotting scheme for automatic optical signal type identification. An optical transponder of the present invention preferably supports so-called 3R regeneration of optical signals as opposed to so-called 2R regeneration, namely, re-timing of optical signals in addition to their re-shaping and re-amplification.

In accordance with a second aspect of the present invention, there is provided an automatic optical signal type identification method comprising the steps of:

(a) converting an optical signal into an electrical signal;

(b) storing a reference pattern dictionary with a plurality of reference, patterns each uniquely identifying a different optical signal type; and (c) spotting a reference pattern embedded in the electrical signal for identifying the optical signal type of the optical signal.

The second aspect of the present invention is based on the fact that each optical signal type has a unique reference pattern in terms of a feature vector, and either a fixed or variable byte length between a pair of immediately consecutive occurrences of its feature vector, thereby enabling its identification from other optical signal types. The automatic optical signal type identification method of the present invention preferably identifies optical signal types ranked by ascending byte length between immediately consecutive occurrences of feature vectors. The automatic optical signal type identification method of the present invention can identify an optical signal type of an optical signal either off-line or on-line from its equivalent electrical signal.

BRIEF DESCRIPTION OF THE DRAWINGS

In order to understand the invention and to see how it can be carried out in practice, preferred embodiments will now be described, by way of non-limiting examples only, with reference to the accompanying drawings, in which similar parts are likewise numbered, and in which:

FIG. 4 is a table showing a reference pattern dictionary for use in conjunction with the automatic optical signal type identification method of FIG. 3;

DETAILED DESCRIPTION OF THE DRAWINGS

Figure 1:
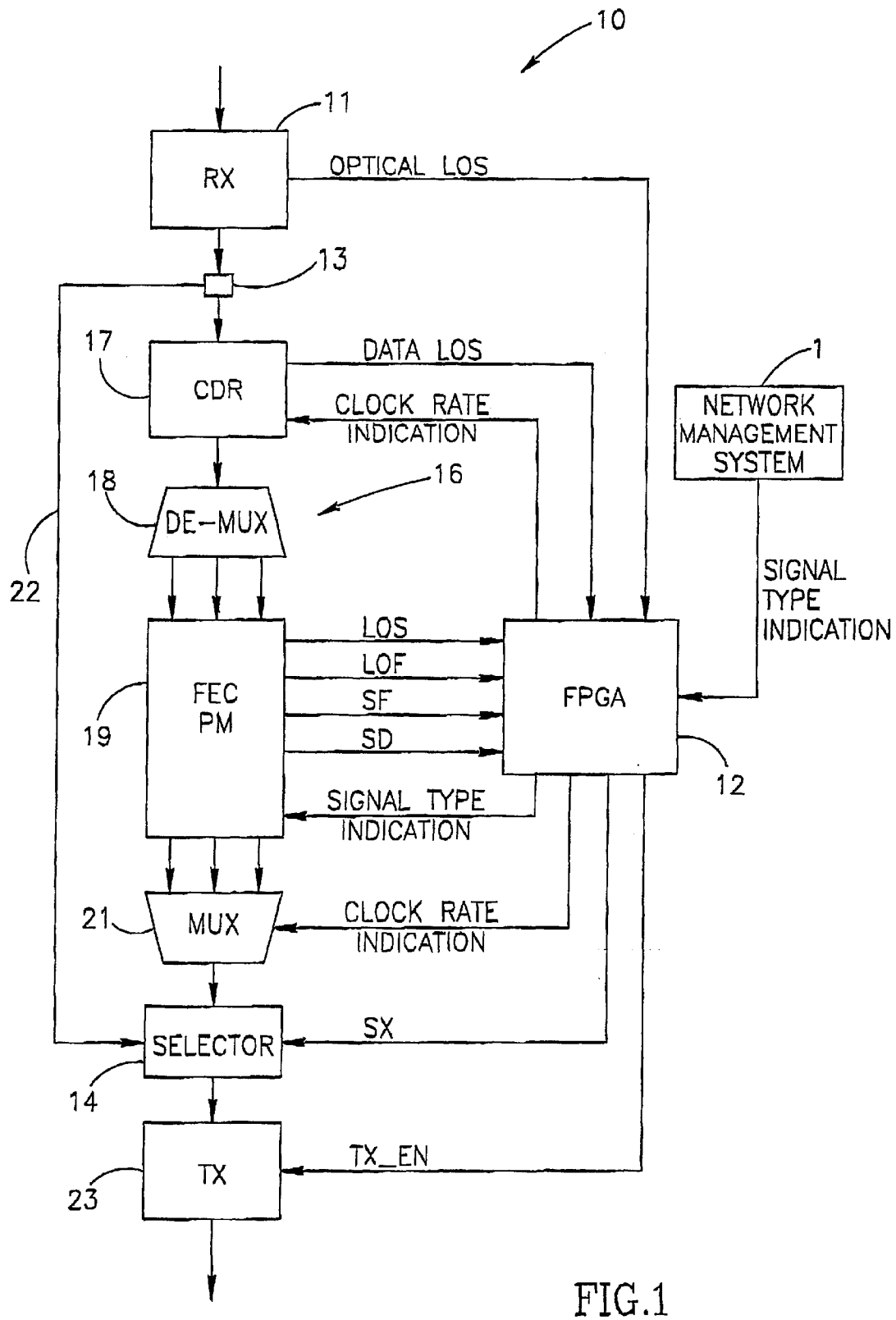
FIG. 1 is a block diagram representation of an externally configurable optical transponder of the present invention.

FIG. 1 shows an optical transponder 10 under the control of a network management system NMS 1 which notifies it by way of an Signal Type Indication signal of the optical signal type of an ingressing optical signal. The optical transponder 10 is implemented to both transpond and performance monitor the following optical signal types. SDH at 155 Mbit/s (STM-1), 622 Mbit/s (STM-4), 2.5 Gbit/s (STM-16), and 10 Gbit/s (STM-64); ATM at 622 Mbit/s and 2.5 Gbit/s; Gigabit Ethernet at 1.25 Gbit/s; and IP at 2.5 and 10 Gbit/s (hereinafter "the list of optical signal types"); and only transpond over optical signal types including inter alia 44 Mbit/s and 140 Mbit/s PDH optical signals.

The optical transponder 10 includes an optical to electrical (O/E) receiver module 11 coupled to an optical signal source (not shown); a field programmable gate array (FPGA) control module 12; an electrical splitter 13; an electrical selector 14 (constituting a switching element); a main path 16 extending between the splitter 13 and the selector 14 and having a Clock and Data Recovery (CDR) unit 17, a demultiplexer 18, a Forward Error Correction (FEC) and Performance Monitoring (PM) unit 19, and a multiplexer 21; a bypass path 22 (constituted by an electrical shunt) extending between the splitter 13 and the selector 14;

and an electrical to optical (E/O) transmitter module 23 coupled to an optical signal destination (not shown).

The O/E receiver module 11 converts an ingressing optical signal to an electrical signal, and provides an optical Loss of Signal (LOS) signal to the FPGA control module 12 in the event that no optical signal is detected thereat. The FPGA control module 12 is informed of the optical signal type of the ingressing optical signal at the O/E receiver module 11 and accordingly provides a Clock Rate Indication signal to both the CDR 17 and the multiplier 21, and a Signal Type Indication signal to the FEC and PM unit 19 to invoke the suitable performance monitoring scheme. The FPGA control module 12 also sets the selector 14 to the main path 16 for any ingressing optical signal in the above mentioned list of optical signal types and to the bypass path 22 for any other ingressing optical signal. The splitter 13 splits an electrical signal from the O/E receiver module 11 into two identical signals which are respectively fed to the main path 16 and the bypass path 22. The CDR unit 17 performs clock and data recovery on an electrical signal, and provides a data Loss of Signal (LOS) signal to the FPGA control module 12 in the event that no data signal i.e. a steam of consecutive zeros is detected thereat. The FEC and PM unit 19 performs forward error correction and performance monitoring on an electrical signal, and provides a data Loss of Signal (LOS) signal, a Loss of Frame (LOF) signal, a Signal Fail (SF) signal and a Signal Degrade (SD) signal to the FPGA control module 12 as appropriate. The selector 14 can feed either an electrical signal from one of the main path 16 or the bypass path 22 to the E/O transmitter module 23 as determined by an SX signal from the FPGA control module 12. The E/O transmitter module 23 is enabled by an TX_EN signal from the FPGA control module 12 and 3R regenerates an egressing optical signal from the electrical signal. The E/O transmitter module 23 provides an TX_LOS signal to the FPGA control module 12 in the event that it is enabled but no optical signal is detected thereat.

The 3R regeneration of an optical signal includes re-timing in addition to re-shaping and re-amplification so as to achieve jitter reduction. The re-timing capability involves the use of several accurate oscillators in the CDR unit 17 to extract the clock signal from the ingressing optical signal, several bandpass filters including narrow bandwidth filters for deriving an accurate and jitter free clock rate, and additional accurate oscillators for re-timing the egressing optical signals.

Performance monitoring (PM) of the above mentioned list of optical signal types is effected as follows: PM for the four SDH optical signal types (STM 1/4/16/64) is on the basis of the B1/B2 bytes as defined in ITU-T G.707; PM for the two ATM optical signal types is on the basis of 8 Error Detection Codes (EDC) in the OAM cell as defined in AF-PHY-00128; PM for the GE optical signal type is on the basis of invalid code words as defined in IEEE 802.3Z; and PM for IP over SDL optical signal types as defined in SDL Data Link Specification published by Lucent Technologies, Sept. 1998.

Figure 2:
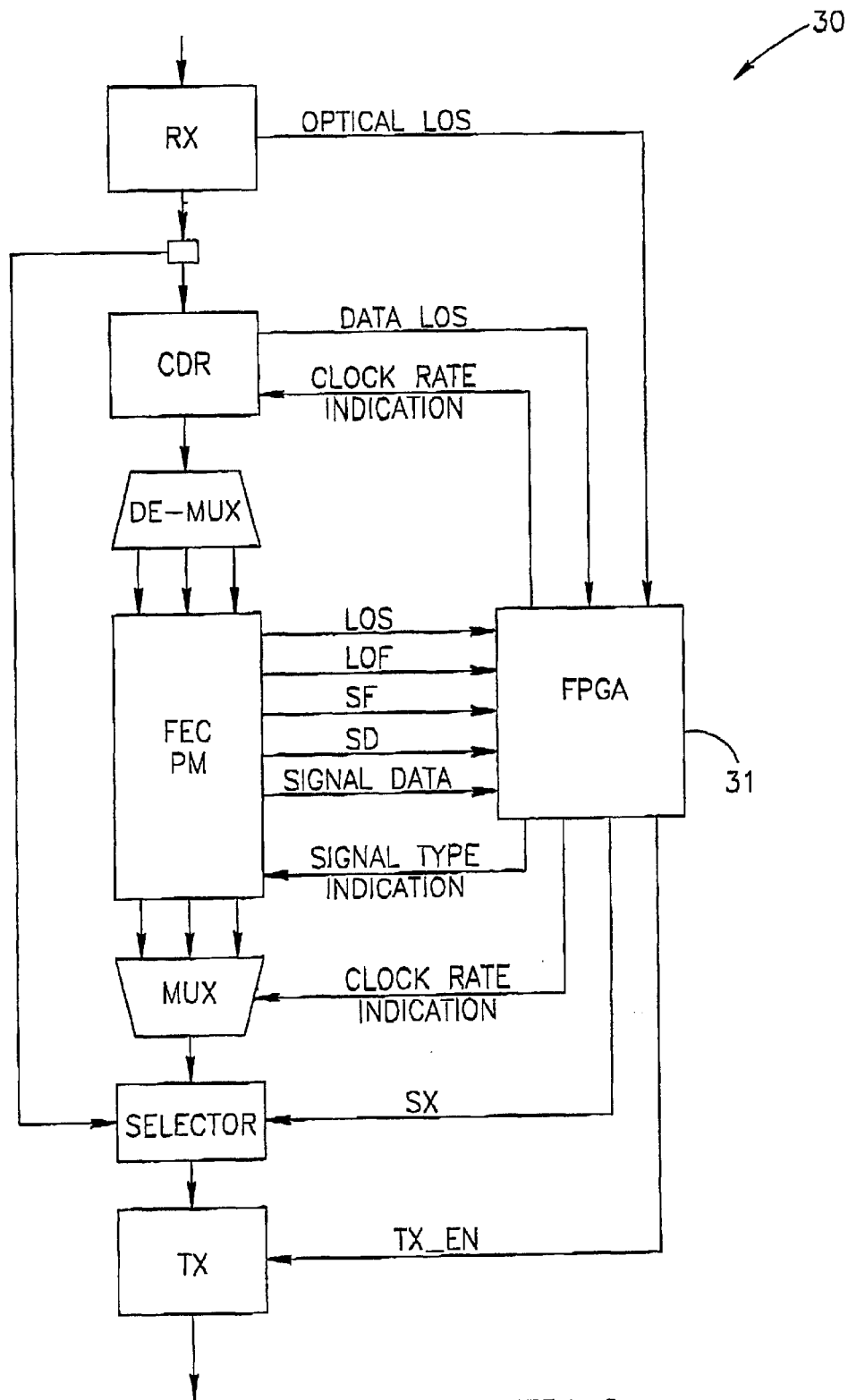
FIG. 2 is a block diagram representation of a self-configurable optical transponder of the present invention.
Figure 3A:
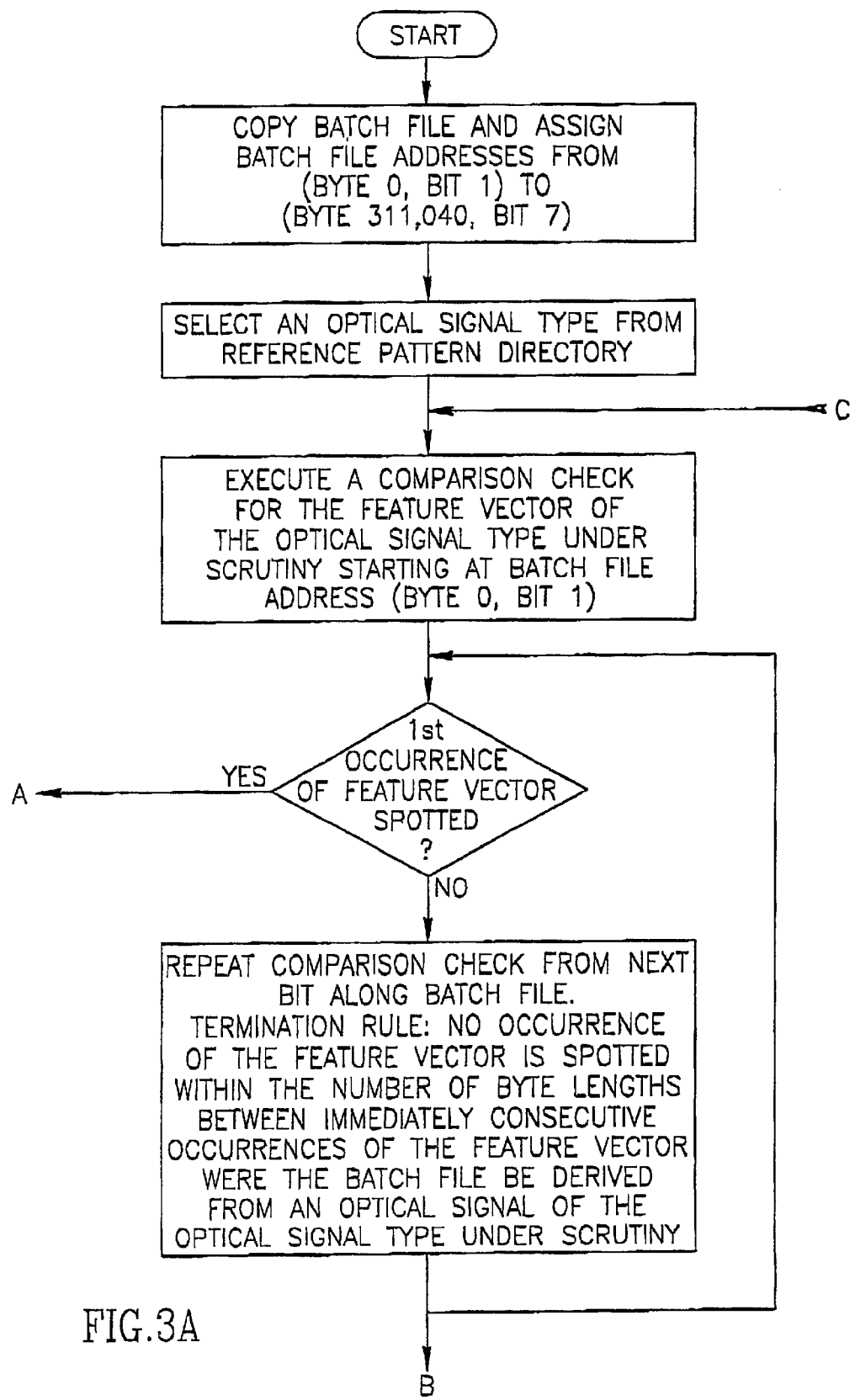
FIG. 3 is a flow diagram showing an automatic optical signal type identification method implemented by the optical transponder of FIG. 2.
Figure 3B:
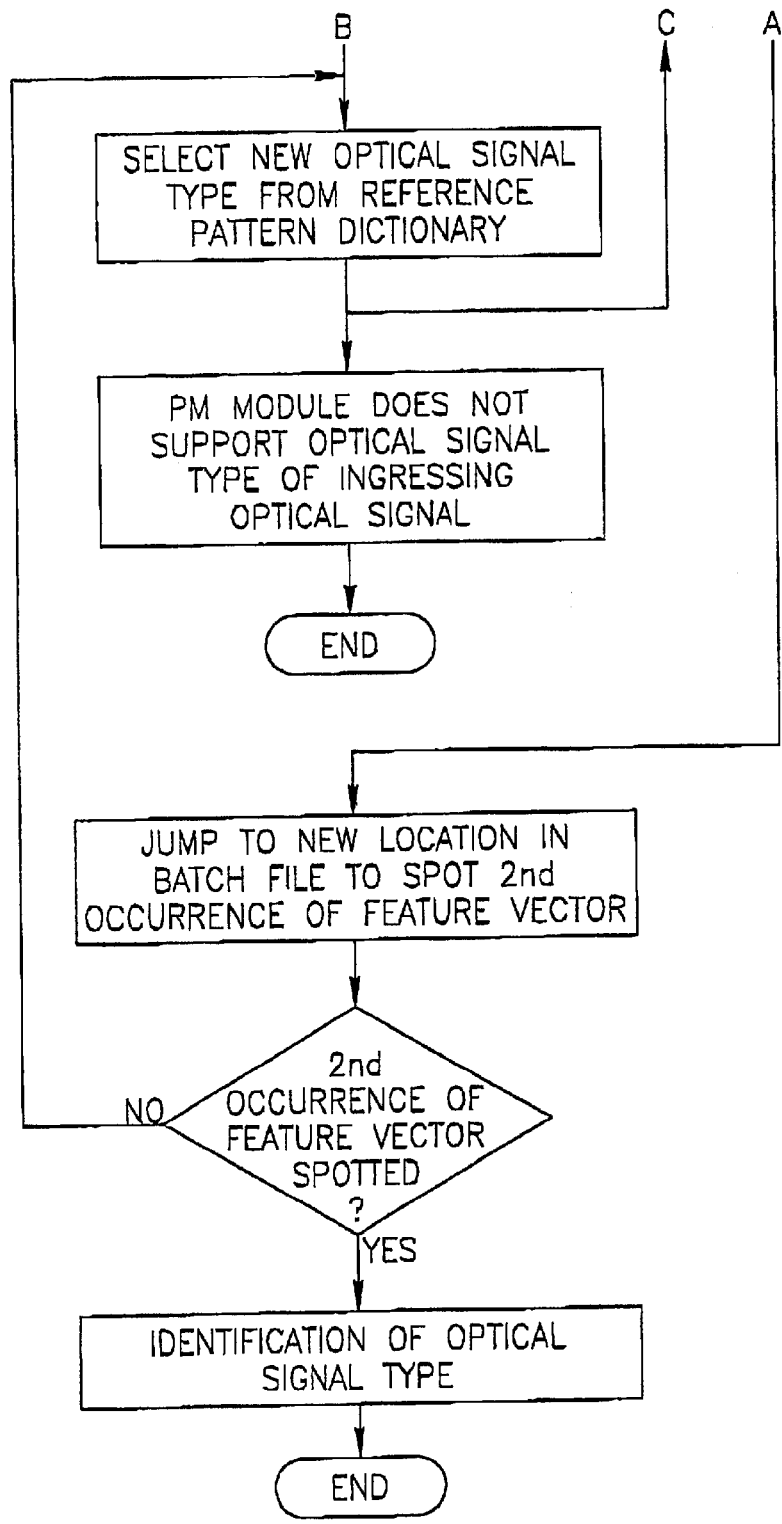

FIG. 2 shows an optical transponder 30 upgraded in respect to the optical transponder 10 by virtue of it having an FPGA control module 31 for supporting an automatic optical signal type identification method of an ingressing optical signal (see FIG. 3). This configuration dispenses with the need for the SIGNAL TYPE INDICATION signal from the network management system NMS 1 but requires in its place that a portion of the electrical signal be fed to the FPGA control module 31 for analysis. The automatic optical signal type identification method operates in conjunction with a reference pattern dictionary containing reference patterns uniquely identifying different optical signal types (see FIG. 4). Each reference pattern includes a so-called feature vector which may be a complete packet header, for example, the different byte length A1/A2 headers of the different bit rate STM optical signals, or a partial packet header, for example, the first four bytes of the F3 OAM cells of an ATM optical signal. In addition, each reference pattern includes the byte length between immediately consecutive occurrences of a feature vector. The byte length may be either a fixed length, for example, in the case of STM1/4/16/64 signals or a variable byte length encoded in a byte length field typically downstream of its associated feature vector.

Generally speaking, the automatic optical signal type identification method involves the spotting of two occurrences of a feature vector of an optical signal type under scrutiny at the byte length as set out in the most righthand column of FIG. 4. The reason that two occurrences is necessary is to avoid the situation that an identification is erroneously deduced on the basis of a single random appearance of bits corresponding to a feature vector of an optical signal type under scrutiny. In order to minimize computational load, the automatic optical signal type identification method applies a reference pattern spotting scheme which attempts to identify optical signal types according to ascending byte length between immediately consecutive occurrences of their respective feature vectors. Thus, for the optical signal types of the above mentioned list of optical signal types for which performance monitoring is supported, their identification order is as follows: GE (upto 2,430 bytes), STM-1 (2,430 bytes), STM-4 (9,720 bytes), ATM (22,843 bytes), STM-16 (38,880 bytes), IP over SDL (up to 65,336 bytes), and STM-64 (155,520 bytes).

The automatic optical signal type identification method can be run off-line as a batch job on a batch file copied from an electrical signal whose size is twice that of the maximum byte length between two immediately consecutive occurrences of a feature vector of an optical signal which may appear as an ingressing optical signal at the optical transponder. Typically, an STM-64 optical signal is a potential ingressing optical signal, and therefore the batch file contains a total of 311,040 bytes. The contents of the batch file are assigned addresses from (BYTE 1, BIT 0) through to (BYTE 311,039, BIT 7), each byte of the batch file in most likelihood overlying two adjacent bytes of the electrical signal to one degree or another. Spotting of the first occurrence of a feature vector involves comparing a feature vector against a corresponding byte length of the batch file starting at batch file address (BYTE 1, BIT 0), and incrementally proceeding downstream bit by bit until either a match is found or, alternatively, the first bit of the feature vector reaches BIT 0 of the first byte of the next frame were the batch file be derived from an optical signal of the optical signal type under scrutiny. Thus, it can be positively deduced that a batch file does not contain the equivalent electrical signal of an STM-1 optical signal if its identifying feature vector cannot be spotted from batch file address (BYTE 0, BIT 1) to batch file address (BYTE 2,430, BIT 0) after a total of 19,440 comparison checks.

The operation of the automatic optical signal type identification method for identification of an STM-64 optical signal whose unique reference pattern includes a 384 byte long feature vector consisting of 192 A1 bytes followed by 192 A2 bytes, and a fixed 155,520 byte length between immediately consecutive occurrences is as follows. Assuming that the first occurrence of the STM-64 identifying feature vector is spotted at batch file address (BYTE 90,000

Figure 5:
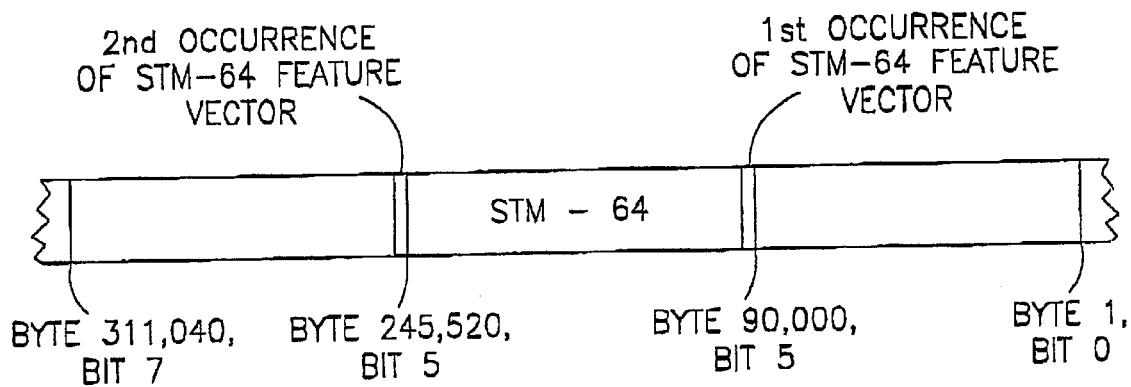
FIG. 5 is a schematic diagram of a batch file originating from an STM-64 optical signal with immediately consecutive occurrences of its uniquely identifying feature vector at batch file addresses (BYTE 90,000, BIT 5) and (BYTE 245,520, BIT 5)
Figure 6:
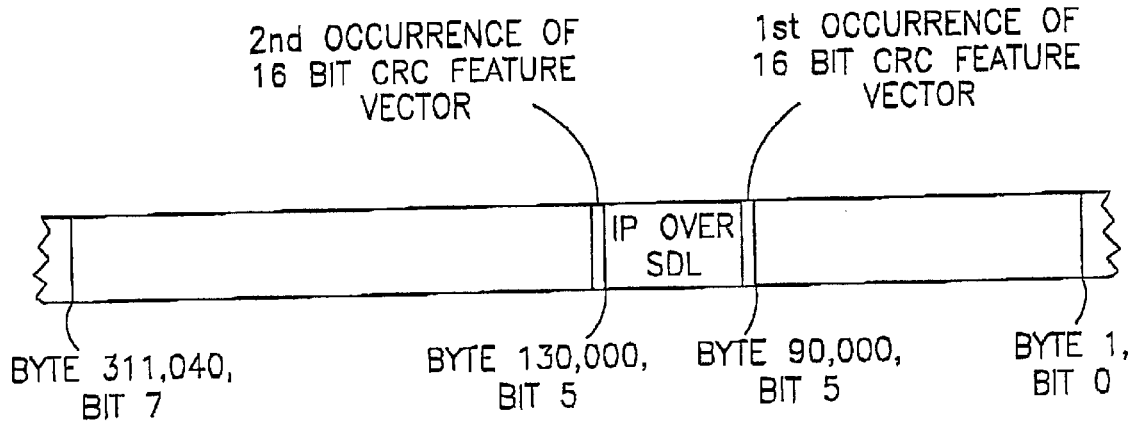
FIG. 6 is a schematic diagram of a batch file originating from an IP over SDL optical signal with immediately consecutive occurrences of its uniquely identifying feature vector at batch file addresses (BYTE 90,000, BIT 5) and (BYTE 130,000, BIT 5).

BIT 5), then the second occurrence is to be found at batch file address (BYTE 245,520, BIT 5) (see FIG. 5). Similarly, assuming the first occurrence of a SDL header is spotted at batch file address (BYTE 90,000, BIT 5), and its byte length field encodes a byte length of 40,000 bytes, then the second occurrence is to be found at batch file address (BYTE 130,000, BIT 5).

On-line identification of an optical signal type is identical to off-line identification including the number of comparison checks before a decision can be deduced that an electrical signal is not derived from an optical signal of the optical signal type under scrutiny. The difference resides in that consecutive comparison checks for the match between a feature vector and an equivalent byte length along the electrical signal are performed on spaced apart byte lengths separated by a byte length corresponding to an integer number of byte lengths equal to the byte length between immediately consecutive occurrences of the feature vector of the optical signal type under scrutiny plus one bit. Thus, for identification of an STM-1 optical signal type, an immediately consecutive comparison check can be performed at the earliest after 19,441 bits (8 bits×2,430 bytes between immediately consecutive occurrences +1 bit). The integral number of byte lengths depends on the run time to execute the comparison check, and the byte length between immediately consecutive occurrences of the feature vector of the optical signal type under scrutiny.

While the invention has been described with respect to a limited number of embodiments, it will be appreciated that many variations, modifications, and other applications of the invention can be made within the scope of the appended claims. For example, an optical transponder of the present invention can be implemented as a unidirectional optical transponder, an add direction optical transponder, and a drop direction optical transponder. Also, the range of optical signals types capable of identification by the automatic optical signal type identification method of the present invention can be extended to include inter alia PDH optical signals.

What is claimed is:

1. An optical transponder comprising an optical/electrical (O/E) receiver module for converting an ingressing optical signal from an optical signal source into an electrical signal; a performance monitoring module for effecting performance monitoring on said electrical signal; and an electrical/optical (E/O) transmitter module for regenerating an egressing optical signal from said electrical signal for feeding to an optical signal destination, wherein said performance monitoring module is capable of effecting performance monitoring on the electrical signal equivalents of at least two different optical signals types each uniquely identifiable in terms of transmission protocol and bit rate, by invoking a suitable performance monitoring scheme for each different optical signal type.

2. The transponder according to claim 1 wherein said transmitter module effects 3R regeneration of egressing optical signals.

3. The transponder according to claim 1 and being externally configurable with the optical signal type of the optical signal.

4. An optical transponder comprising an optical/electrical (O/E) receiver module for converting an ingressing optical signal from an optical signal source into an electrical signal; a performance monitoring module for effecting performance monitoring on said electrical signal; and an electrical/optical (E/O) transmitter module for regenerating an egressing optical signal from said electrical signal for feeding to an optical signal destination, wherein said performance monitoring module is capable of effecting performance monitoring on the electrical signal equivalents of at least two different optical signals types each uniquely identifiable in terms of transmission protocol and bit rate, and further comprising an electrical shunt between said O/E receiver module and said E/O transmitter module bypassing said performance monitoring module for shunting an electrical signal converted from an optical signal whose performance monitoring is not supported by said performance monitoring module therearound.

5. An optical transponder comprising an optical/electrical (O/E) receiver module for converting an ingressing optical signal from an optical signal source into an electrical signal; a performance monitoring module for effecting performance monitoring on said electrical signal; and an electrical/optical (E/O) transmitter module for regenerating an egressing optical signal from said electrical signal for feeding to an optical signal destination, wherein said performance monitoring module is capable of effecting performance monitoring on the electrical signal equivalents of at least two different optical signals types each uniquely identifiable in terms of transmission protocol and bit rate, said transponder being self-configurable with the optical signal type of the optical signal, wherein said performance monitoring module is capable of distinguishing between the electrical signal equivalents of at least two different optical signal types, and is capable of effecting performance monitoring by invoking a suitable performance monitoring scheme for each identified optical signal type.

6. The transponder according to claim 5 and further comprising a control module for storing a reference pattern dictionary with a plurality of reference patterns each uniquely identifying a different optical signal type, and spotting a reference pattern embedded in the electrical signal for identifying the optical signal type of the optical signal.

7. The transponder according to claim 6 wherein said control module spots a first occurrence of a feature vector uniquely identified with a transmission protocol embedded in the electrical signal at a first location therealong; identifies the transmission protocol associated with the feature vector and jumps to a second location along the electrical signal downstream from the first location by a fixed byte length associated with the transmission protocol as specified in the reference pattern dictionary; and spots the second occurrence of the feature vector embedded in the electrical signal at the second location.

8. The transponder according to claim 7 wherein said control module identifies the optical signal type of the optical signal off-line from its equivalent electrical signal.

9. The transponder according to claim 7 wherein said control module identifies the optical signal type of the optical signal on-line from its equivalent electrical signal.

10. The transponder according to claim 6 wherein said control module spots a first occurrence of a feature vector uniquely identified with a transmission protocol embedded in the electrical signal at a first location therealong; identifies the transmission protocol associated with the feature vector; reads a byte length field embedded in the electrical signal as determined by the transmission protocol, and jumps to a second location along the electrical signal downstream from the first location by the byte length encoded in the byte length field; and spots the second occurrence of the feature vector embedded in the electrical signal at the second location.

11. The transponder according to claim 10 wherein said control module identifies the optical signal type of the optical signal off-line from its equivalent electrical signal.

12. The transponder according to claim 10 wherein said control module identifies the optical signal type of the optical signal on-line from its equivalent electrical signal.

13. The transponder according to claim 6 wherein said control module identifies optical signal types ranked by ascending byte length between a pair of immediately consecutive occurrences of their respective feature vectors of their respective reference patterns stored in said reference pattern dictionary.

* * * * *